Dec. 31, 1940.  C. A. G. PRITCHARD  2,227,105
SPRINKLING PIPE AND ROTATABLE COUPLING THEREFOR
Filed Oct. 23, 1939

INVENTOR.
Charles A. G. Pritchard
BY Hull, Brock & West
ATTORNEYS.

Patented Dec. 31, 1940

2,227,105

UNITED STATES PATENT OFFICE 2,227,105

SPRINKLING PIPE AND ROTATABLE COUPLING THEREFOR

Charles A. G. Pritchard, Parma, Ohio

Application October 23, 1939, Serial No. 300,740

2 Claims. (Cl. 285—97.5)

This invention relates to means for spraying plants from extended perforated pipes and to a construction of coupling which will enable said pipes to be readily and conveniently rotated for the purpose of spraying extended and separated areas of plants.

One of the fields wherein my invention is particularly useful is in greenhouses. In using my invention therein the perforated pipe will extend substantially the full length of a greenhouse and can be rotated from either end by means of the coupling applied thereto.

A further object of the invention is to provide a coupling which is particularly adapted to enable a pipe connected to a member thereof to be rotated by said member while preventing leakage through the parts of said coupling.

Figure 1:
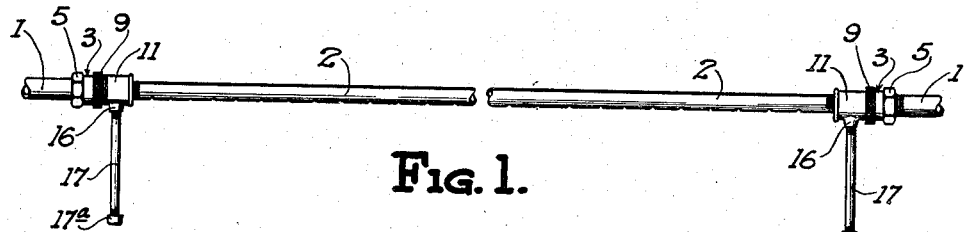
Figure 2:
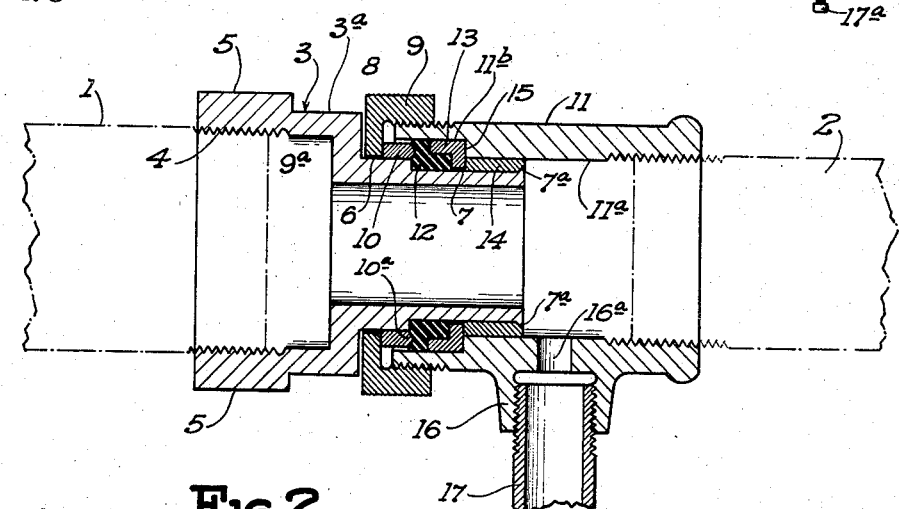
Figures 3, 4:
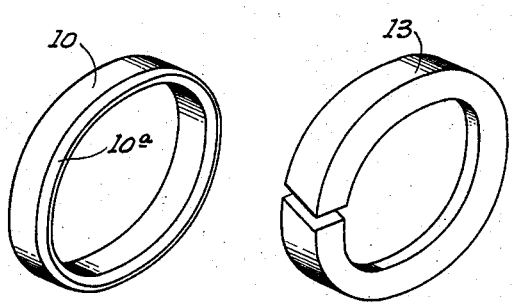
Figure 5:
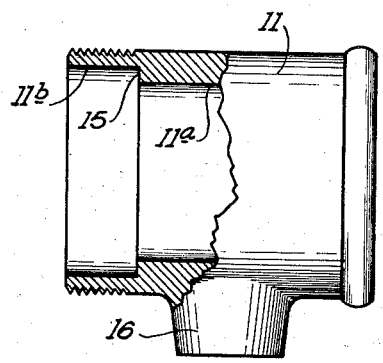
Figure 6:
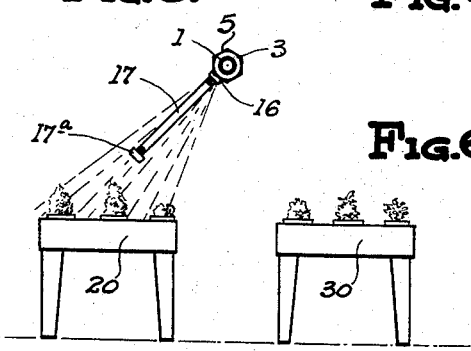

In the drawing hereof, Fig. 1 is a longitudinal diagrammatic elevation of the spraying means, showing the manner in which my couplings cooperate with a long perforated pipe such as may be employed for the purposes stated; Fig. 2 a central longitudinal section through one of the coupling members of Fig. 1, the pipe sections connected thereby being indicated by dot-and-dash lines; Figs. 3 and 4 are details in perspective of sealing members employed with my coupling; Fig. 5 a detail partly in section showing one of the coupling members shown in Fig. 2; and Fig. 6 is an end elevation of the construction shown in Fig. 1.

Describing the various parts by reference characters, 1 and 2 denote pipes which are to be connected by my coupling, the details of which will now be described, it being noted that each coupling comprises a member which in practice is non-rotatably connected with one of the pipes, and a member, rotatably mounted with respect to the former member, and to which the other pipe is connected for rotation with the latter member. 3 denotes the supporting coupling member, the same having an enlarged internally threaded end 4 within which the end of the pipe 1 is screwed. This member is provided at its enlarged end with wrench-engaging surfaces 5 whereby it may be rotated or held against rotation, if necessary. For convenience of description, the end of the member 3 which receives the pipe 1 will be referred to as the rear end. The front end of this member is considerably less in diameter than the rear end and is provided with three cylindrical surfaces 3ª, 6 and 7, the first of these surfaces having a greater radius than the second surface and the second surface having a greater radius than the third. Between the external cylindrical surface 3ª and the surface 6 there is provided an annular radial shoulder 8. 9 denotes a clamping ring having an inwardly extending radial flange 9ª and the interior of which fits loosely upon and is rotatable about the cylindrical surface 6.

10 denotes a metal sleeve which is mounted upon the surface 6 with its rear face in engagement with the flange 9ª the front face being tapered, as shown at 10ª.

11 denotes the other or front member of my coupling, the same being internally threaded for the reception of the threaded rear end of the pipe 2. This member is provided with a cylindrical bore 11ª of greater diameter than the diameter of the front end 7 of the coupling member 3; also with a larger cylindrical bore 11ᵇ at its rear end, there being a radial annular shoulder 15 interposed between said bores. The rear end of the member 11 is provided with an external thread adapted to receive the internal threads on the clamping ring 9.

For the purpose of forming a leak-proof seal between the coupling members, an L-shaped gasket 12, preferably of compressible resilient material, such as rubber, is applied to the rear end of the cylindrical surface 7, fitting closely thereabout and with its rear radial flanged end engaging the shoulder formed between the surfaces 6 and 7 and also the tapered end of the metallic ring 10. A split metallic ring 13 which is of inverted L-shape in section is next applied to the reduced front portion 7 of the member 3. It will be noted that the ring 13 consists of a circumferential flange that is adapted to overlap and seat upon the forwardly projecting circumferential flange of the gasket 12 therebeneath and that its depending flanged portion is adapted to also engage the front end of the said gasket 12. The sealing members 10, 12 and 13 and the clamping ring 9 are held in assembled position upon member 3 by a ring 14 which fills the space between the interior of member 11 and the exterior of the cylindrical surface 7 of the supporting member 3. The ring 14 is secured on the front end of the stationary member preferably by peening the same thereto, as indicated at 7ª.

With the parts constructed and arranged as described, the member 11 will be connected to the member 3 by slipping its rear end over the sealing rings and will be retained in operative relation to the member 3 and the sealing rings by means of the clamping ring 9. It will be evident that, by setting up the clamping ring, the sealing rings will be compressed between the cooperating portions of the member 11 and the flange 9ª of the clamping ring. As will be seen, this will result in forcing the tapered end of the ring 10 into the radial flange of the gasket 12, forcing the top of its vertical flange against the overhanging surface 11ᵇ of the member 11 and its base against the surface 7. A leak-proof seal is thus provided between the members 3 and 11.

Assuming that a pair of my couplings are applied to a long perforated pipe, such as the pipe 2, the latter pipe may be rotated so as to direct water from said openings upon the plants upon either of the banks or tables 20 and 30, merely by rotating the member 11 at either end of the said pipe which ends, in practice, will be at the end of the greenhouse. For the purpose of facilitating such rotation, the member 11 is provided with an internally threaded boss 16 for the reception of an externally threaded handle 17. The pipe 1 through which water may be conducted to the coupling members will, of course, be provided with ordinary control valves. If desired, a hole 16ª may be drilled in member 11 in alignment with boss 16 to facilitate drainage of the pipe 2 thru the hollow handle 17 when the cap 17ª is removed from said handle.

Having thus described my invention, what I claim is:

1. A rotatable coupling comprising in combination a stationary coupling member having a bore therethrough and provided with a front exterior cylindrical surface and a rear cylindrical surface of greater diameter than the front cylindrical surface, with a radial annular shoulder interposed between said surfaces, a rotatable coupling member having a bore therethrough and the rear portion whereof surrounds the front portion of the stationary member and is provided within its rear end with a cylindrical inner wall connected with the bore proper by radially inwardly extending annular shoulder, the said inner wall overhanging and spaced from the said cylindrical surfaces, a clamping ring having an inwardly extending radial flange surrounding the rear cylindrical surface, a sealing sleeve slidably mounted upon said rear surface with its rear edge engaged by said flange and having a front tapered edge adapted to overhang the shoulder at the front of said rear surface, an L-shaped sealing ring of deformable material having a cylindrical base flange seated on the front cylindrical surface of the stationary member and having its radial flange extending to and in substantial engagement with the said cylindrical inner wall and its rear surface in engagement with the front edge of the said sleeve and with the shoulder between the said cylindrical surfaces of the stationary member, a rigid sealing ring of inverted L-shape in section in front of said deformable ring and having an annular radial flange and an outer circumferential flange extending in proximity to the said cylindrical inner wall of the rotatable member, with the rear edge of said circumferential flange engaging the front surface of the radial flange of the first sealing ring and the inner surface of said circumferential flange engaging the outer surface of the base flange of the deformable ring and the rear surface of its radial flange engaging the front edge of the said base flange and its outer front surface engaged by the shoulder at the front of the said cylindrical wall, and a threaded connection between said clamping ring and the rear end of the rotatable member.

2. In the rotatable coupling set forth in claim 1, a ring secured upon the front end of the stationary member and substantially filling the space between such end and the surrounding portion of the bore of the rotatable member, the rear end of said ring being adapted to engage the radial flange of the second sealing ring thereby to retain the sealing rings, the sealing sleeve, and the clamping ring in assembled relation upon the stationary member.

CHARLES A. G. PRITCHARD.